(12) United States Patent
Hudson et al.

(10) Patent No.: US 6,300,393 B1
(45) Date of Patent: Oct. 9, 2001

(54) INSOLUBILIZING ADDITIVES FOR PAPER COATING BINDERS AND PAPER SURFACE SIZE

(76) Inventors: Alice P. Hudson; James E. Nevin, both of 328 W. 11th St., Riviera Beach, FL (US) 33404

( * ) Notice: Subject to any disclaimer, the term of this patent is extended or adjusted under 35 U.S.C. 154(b) by 0 days.

(21) Appl. No.: 09/593,596

(22) Filed: Jun. 12, 2000

Related U.S. Application Data

(63) Continuation of application No. 08/958,709, filed on Nov. 17, 1997.

(51) Int. Cl.$^7$ ..................................................... C08L 89/00
(52) U.S. Cl. ............................... 524/26; 524/52; 524/503
(58) Field of Search ................................ 524/26, 52, 503

(56) References Cited

U.S. PATENT DOCUMENTS

| | | | |
|---|---|---|---|
| 3,002,860 | 10/1961 | Bishop et al. ......................... | 117/155 |
| 3,251,709 | 5/1966 | Bonzagni ............................. | 117/76 |
| 3,261,798 | 7/1966 | Farley ................................. | 260/29.6 |
| 3,320,080 | 5/1967 | Mazzarella et al. .................. | 106/210 |
| 3,368,987 | 2/1968 | Pollart et al. ........................ | 260/17.4 |
| 3,382,142 | 5/1968 | Hine et al. ........................... | 162/168 |
| 3,442,698 | 5/1969 | Dill et al. ............................. | 117/155 |
| 3,468,823 | 9/1969 | Graham et al. ....................... | 260/17.4 |
| 3,884,853 | 5/1975 | Zimmerman ......................... | 260/17.3 |
| 3,925,328 | 12/1975 | Shibahara et al. ................... | 260/78.5 |
| 3,939,108 | * 2/1976 | Sirota et al. ......................... | 524/52 |
| 4,001,193 | 1/1977 | Von Bonin ........................... | 526/26 |
| 4,118,541 | 10/1978 | Power et al. ......................... | 428/452 |
| 4,153,458 | * 5/1979 | Iguchi et al. ........................ | 524/503 |
| 4,221,886 | 9/1980 | Topfi ................................... | 525/329 |
| 4,298,513 | * 11/1981 | Distler et al. ........................ | 524/52 |
| 5,098,943 | * 3/1992 | Tagawa et al. ...................... | 524/503 |
| 5,599,870 | * 2/1997 | Nakamae et al. .................... | 524/503 |

FOREIGN PATENT DOCUMENTS

| | | | |
|---|---|---|---|
| 2181332 | 1/1997 | (CA) | D21H/19/82 |

* cited by examiner

*Primary Examiner*—Bernard Lipman

(57) ABSTRACT

Insolubilizing agents are disclosed for pigment binders and surface sizes containing functional groups capable of reacting with carboxylic acid anhydride moieties to form chemical bonds. The insolubilizing agents are polymers or other compounds containing a plurality of carboxylic acid anhydride moieties per molecular entity. The anhydride moieties do not substantially hydrolyze or otherwise react until the paper coating is applied to the paper and dried and cured, at which time the anhydride moieties react with the functional groups of the pigment binder or surface size and render it water insoluble. A method to improve the water resistance and printability of coated paper using the insolubilizing agents of the invention is also disclosed.

23 Claims, No Drawings

INSOLUBILIZING ADDITIVES FOR PAPER COATING BINDERS AND PAPER SURFACE SIZE

This Application is a continuation of Ser. No. 08/958,709 Nov. 17, 1997.

FIELD OF THE INVENTION

This invention relates to insolubilizing agents for binders in paper coatings and paper surface sizes.

BACKGROUND OF THE INVENTION

Paper coating compositions are generally fluid aqueous suspensions of one or more pigments, such as kaolin, titanium dioxide, calcium carbonate, or alumina; and one or more pigment binder materials derived from starch, protein, or synthetic polymers. Insolubilizing agents for the pigment binders are used to reduce the water sensitivity of the binders and improve the surface strength of the coated sheet, qualities necessary to allow the use of aqueous inks and allow the paper to withstand the mechanical stresses of printing.

Paper sizing compositions are used to improve the water and oil resistance and printability of the paper to which they are applied. They are applied by either of two methods; (1) They can be added to the pulp or furnish immediately prior to the formation of the sheet. This is commonly called "wet end" or "internal" sizing. Internal sizes can be rosin based, often used in combination with alum, alkyl ketene dimer compositions, or alkenyl succinic anhydride compositions. (2) They can be applied in a separate size press or surface coating operation after the sheet has been formed and dried. The insolubilizing agents of this invention are applicable to sizing compositions which are applied by the second method, in a size press or surface coating operation. The sizing compositions applied in this manner are commonly starches or synthetic polymers. The use of insolubilizing agents for these sizing compositions decreases their water sensitivity and improves the printability of the paper produced. For the purposes of this patent, paper sizing compositions applied in a size press or surface coating operation (method 2) will be referred to as "paper coatings" to distinguish them from internal sizing compositions.

A number of insolubilizing agents are commercially available and have been used to insolubilize binding materials in paper coatings and paper surface coatings. Formaldehyde has been used in the past but is no longer widely used due to highly restrictive environmental laws that limit vapor concentrations of formaldehyde to extremely low levels. It is quite effective as an insolubilizer with protein binders but is not as effective with starch and synthetic polymers at the alkane pH values in paper coatings.

Glyoxal does not have the severe environmental restrictions of formaldehyde and is effective with synthetic polymers and starch as well as with protein. However, the addition of glyoxal tends to undesirably increase the viscosity of the coating compositions, which renders the coatings difficult to apply on modern high speed paper making machinery. The use of glyoxal can also cause discoloration of the coating compositions and the papers to which they are applied.

At one time urea formaldehyde and melamine formaldehyde resins were the predominant insolubilizers in the paper industry, and melaminue formaldehyde resins and particularly the alkylated resins are still widely used. However, the resins contain up to about 1% free formaldehyde and can evolve formaldehyde vapors in the drying and curing operations and thus their use requires strict environmental controls. Also, an acid catalyst may be required to effect the cure. In addition they do not cure rapidly and may require an aging period before a complete cure is effected.

Modified glyoxal resins have come into wide use most recently. They do not release formaldehyde vapors, they do not require a catalyst, and the paper is cured immediately on drying. These resins are highly reactive and tend to crosslink and precipitate in concentrated solutions containing more than about 10 percent by weight resin material. Thus they are difficult to manufacture in a stable concentrated form, and a compromise is necessary between the degree of dilution of the agents and the expected shelf life.

Metal salts can also be used as insolubilizers. The most commonly used is ammonium zirconium carbonate, primarily for protein coatings. These products are quite unstable to heaing, dilution, and pH changes. They also give off an undesirable ammonia odor on curing.

Maleic anhydride copolymer derivatives are used extensively in the manufacture of paper, usually as surface coating agents. To prepare them for use in this application, the maleic anhydride copolymers are either neutralized by the addition of basic materials to form salt solutions, or they are modified by esterification or amide formation prior to their addition to or use as coating compositions. The anhydride moieties are destroyed by these treatments and are no longer available to react with and insolubilize the binders and coatings used in these formulations.

A further requirement for reagents to be used in paper manufacture is that they be nontoxic so that the paper products manufactured can be used for packaging foods without introducing harmful substances.

It would be desirable to have effective insolubilizing agents for paper coatings which do not have adverse toxicity or environmental effects, do not cause undesirable color formation in the paper, do not increase the viscosity of the paper coatings to which they are added, and can be marketed as shelf stable compositions with high levels of reactive functionality.

Objects of the Invention:

The primary object of this invention is the provision of effective insolubilizing agents for paper coatings.

Another object is the provision of insolubilizing agents for paper coatings that do not contain aldehydes.

Another object is the provision of insolubilizng agents for paper coatings that do not increase the viscosity of the paper coating suspension.

Another object is the provision of insolubilizing agents for paper coatings that can be marketed in shelf stable formulations with a high content of reactive functionality.

A further object is the provision of insolubilizing agents for paper coatings that do not present environmental hazards in use and are not toxic and so that they can be used in paper products that come in contact with food.

SUMMARY OF THE INVENTION

These and other objectives are achieved by the provision of insolubilizing agents for starch, protein, synthetic polymers, and modifications thereon which are used as pigment binders and surface coatings in paper manufacture. The insolubilizing agents are polymers or other compounds containing a plurality of carboxylic acid anhydride moieties per molecular entity. The pigment binders and surface coatings useful in this invention contain functional groups capable of reacting with carboxylic acid anhydride moieties to form chemical bonds. The anhydride moieties do not substantially hydrolyze or otherwise react until the paper coating is applied to the paper and dried and cured, at which time the anhydride moieties react with the functional groups, which usually contain "active" or labile hydrogen functionality, on the starch, protein, or synthetic polymer binder or coating agent, and render the binder or coating agent water insoluble.

Another aspect of the invention is the provision of a method to improve the water resistance and printability of coated paper. The method consists of adding polymers or other compounds containing a plurality of carboxylic acid anhydride moieties to paper coating compositions containing natural or synthetic polymers with functional groups reactive with the anhydride moieties. The coating compositions are applied to paper products and cured. In the curing step of the method, usually accomplished by heating the coated paper, the anhydride moieties of the insolubilizing agent react with the reactive functional groups of the polymers in the coating compositions and render them water insoluble.

A further aspect of the invention is the provision of paper compositions wherein paper bases are coated with paper coating compositions containing pigment binders and coatings which are insolubilized with the carboxylic acid anhydride containing agents of this invention.

DESCRIPTION OF THE PREFERRED EMBODIMENTS

The compounds useful in this invention are carboxylic acid anhydrides which contain a plurality of anhydride moieties on each molecular entity. They include copolymers of maleic anhydride, itaconic anhydride, aconitic anhydride, and citriconic anhydride. Maleic anhydride copolymers are preferred because they are readily available and have the lowest equivalent weight per anhydride functionality. The comonomers are chosen from vinyl monomers which are aprotic and copolymerize with maleic anhydride either as random copolymers or as 1:1 alternating copolymers. Monomers which form copolymers with low equivalent weights/anhydride functionality are more efficient in this application and are preferred. Suitable comonomers include:

(a) Straight chain or branched olefins containing from about 2 to about 14 carbon atoms. Examples include normal a olefins with about 2 to about 14 carbon atoms, branched a olefins containing about 2 to about 14 carbon atoms, normal or branched alkenes containing conjugated dienes and about 4 to about 14 carbon atoms, normal olefins containing 1 internal double bond and about 4 to about 14 carbon atoms, olefins containing vinylidene groups and about 6 to about 14 carbon atoms, and cyclic olefins such as cyclohexene, cyclopentene, and norbornene. Examples of maleic acid copolymers of olefins include ethylene maleic anhydride copolymers which are sold as EMA resins by Zeeland Chemicals, Zeeland MI; isobutylene maleic anhydride copolymers which are sold as Isobam Resins 4, 6, 10, and 600, by Kuraray, Ltd., Osaka, Japan; a butadiene maleic anhydride copolymer which is sold as Maldenes 285 and by Lindau Chemicals, Columbia, S.C.; and linear α olefin maleic anhydride copolymers wherein the α olefins contain between 6 and 14 carbon atoms. Olefins with unsaturation in the a position are preferred, and olefins with about 2 to about 6 carbon atoms are also preferred.

(b) Styrene and substituted styrenes, including α methyl styrene, β methyl styrene, 2-methyl styrene, 3-methyl styrene, 4-methyl styrene, 2-chlorostyrene, 3-chlorostyrene, and 4-chlorostyrene. Suitable maleic anhydride copolymers include styene maleic anhydride copolymers which are available as SMA-1000A, SMA-2000A, and SMA-3000A from Elf Atochem, Philadelphia, Pa. Styrene is preferred over substituted styrenes, and copolymers with a 1:1 ratio of styrene to maleic anhydride are preferred.

(c) Vinyl and allyl alkyl ethers wherein the alkyl groups contain from about 1 to about 10 carbon atoms, and can be straight chain or branched. Methyl vinyl ether maleic anhydride copolymers are available as for example Gantrez AN-119, AN-129, AN-139, AN-149, AN-159, AN-169, and AN-179 from International Specialty Products, Belleville, N.J. Vinyl alkyl ethers wherein the alkyl group contains about 1 to about 4 carbon atoms are preferred.

Other maleic anhydride copolymers suitable for use in this invention are readily produced, but are not currently commercially available in the anhydride form required. These include but are not limited to copolymers in which the comonomer can be vinyl acetate, allyl acetate, alkyl acrylates and methacrylates wherein the alkyl group contains about 1 to about 10 carbon atoms, N-vinyl pyrrolidinone, N-vinyl succinimide, N-vinyl caprolactam, N-vinylphthalimide, acrylamide and N-alkyl substituted acrylamide, methacrylamide and N-alkyl substituted methacrylamide, acrylonitrile, vinyl chloride and other chlorinated olefins.

The molecular weights of the copolymers are preferably such that low viscosity solutions in solvents can be prepared in concentrations of at least about 25% by weight of the copolymer in solvent. In general lower molecular weight copolymers are preferred because they form lower viscosity solutions in solvents. The low viscosity solutions are more readily dispersed as very small particles or droplets into the paper coating compositions, which results in more intimate mixing with the binder or surface coating materials and thus more complete reaction of the anhydiide moieties of the insolubilizing agent with the active hydrogen moieties of the coating binders.

The carboxylic acid anhydrides may also be monomeric entities. Examples include benzophenone tetracarboxylic acid dianhydride, and benzene 1,2,4,5 tetracarboxylic acid dianhydride.

The polyanhydride compounds will effectively insolubilize the pigment binders or surface coating compositions when they are added to the paper coating or compositions as very small particles of less than about 100 microns, with smaller particles being preferred. However because of the difficulty and expense of manufacturing suitably small particles, and also the difficulty in handling these powders in the paper manufacturing operation and uniformly dispersing them into the coating compositions, the compounds are preferably dissolved in an aprotic solvent that does not react with the anhydride moieties, or in a mixture of such solvents, prior to addition to the paper coating composition.

For copolymers such as ethylene-maleic anhydride and methyl vinyl ether-maleic anhydride which are readily dispersed in water, the solvent may be soluble in water. Suitable water soluble solvents include acetone, methylethyl ketone, diethylene glycol dimethyl ether, ethylene glycol dimethyl ether, ethylene glycol diethyl ether, ethylene glycol ethyl ether acetate, ethylene glycol methyl ether acetate, propylene glycol methyl ether acetate, ethylene glycol diacetate, dimethyl formamide, tetrahydrofuran, dioxane, and N-methyl pyrrolidinone. Preferred solvents are those which have flash points, measured by the Tagg Closed Cup (TCC) method, of greater than about 38° C. These include diethylene glycol dimethyl ether, ethylene glycol ethyl ether acetate, ethylene glycol methyl ether acetate, propylene glycol methyl ether acetate, ethylene glycol diacetate, dimethyl formamide, and N-methyl pyrrolidinone.

For copolymers such as styrene-maleic anhydride and $C_6$ to $C_{14}$ olefin-maleic anhydride which are insoluble in water, the solvents preferably have a solubility in water of less than about 10% by weight, and more preferably less than about 1% by weight. Suitably water insoluble solvents include alkyl acetates wherein the alkyl groups contain about 2 to about 10 carbon atoms and can be normal or branched. Examples of alkyl groups include ethyl, n-propyl, isoptropyl, n-butyl, isobutyl, n-amyl, isoamyl, n-hexyl, n-heptyl, n-octyl, 2-ethylhexyl, n-nonyl, isononyl, n-decyl, and isodecyl. Available acetates include hexyl acetate and heptyl acetate sold as Exxates 600 and 700 by Exxon Chemical Company, Houston, Tex. Other suitable water insoluble solvents include ethyl-3-ethoxy proprionate, isobutyl isobutyrate, dimethyl adipate, dimethyl glutarate, dimethyl succinate, diethylene glycol butyl ether acetate, ethylene glycol butyl ether acetate, methyl propyl ketone, 3-pentanone, methyl isobutyl ketone, methyl amyl ketone, methyl isoamyl ketone, isophorone, and cyclohexanone. Preferred are those with TCC flash points greater than about 38° C. These include n-amyl acetate, n-hexyl acetate, n-heptyl acetate, ethyl 3-ethoxyproprionate, dimethyl adipate, dimethyl glutarate, dimethyl succinate, diethylene glycol butyl ether acetate, ethylene glycol butyl ether acetate, isophorone, and cyclohexanone.

Hydrocarbon solvents are less preferred because as a rule the anhydride compounds of the invention require more polar solvents and are not soluble in them. Halogenated solvents are also less preferred because of the environmental considerations accompanying their use.

The preferred solvents are those which possess the following properties:

(1) They are unreactive with the anhydride functionality of the insolubilizing agents so that the anhydride is available to react with the pigment binders or surface coating materials.

(2) They have TCC flash points above about 38° C., and thus do not represent an undue fire hazard.

(3) They form low viscosity solutions of the anhydride copolymers at concentrations of at least about 25% by weight copolymer so that a minimum amount of solvent is added to the paper coatings. Minimizing the amount of solvent decreases the cost, and also minimizes any adverse effects that may be present from the solvent in the paper coatings, such as the tendency to form coated paper with an "orange peel" or cratered surface.

(4) They render the copolymer solution readily dispersible in the aqueous coating composition.

Binders for pigments in paper coatings and surface coatings which are advantageously insolubilized with the carboxylic acid anhydride containing compounds of this invention are those which contain functional groups capable of reacting with carboxylic acid anhydride moieties to form chemical bonds. The functional groups usually possess "active" or labile hydrogen atoms such as hydroxyl, sulfhydryl, carboxyl, amine, or amide groups. These groups react with the anhydride moieties of the insolubilizers, resulting in crosslinking and insolubilization of the binder or surface coating materials. Suitable binders and surface coating materials include starches and modified starches, proteins and modified proteins, and synthetic polymers such as polyvinyl alcohol, and polyvinyl acetate.

Starches and modified starches can be obtained from corn, potato, or other common starch sources. Useful modifications of starches for use in paper coatings include heat conversion, caustic treatment, acid modification, oxidation with hypochlorite, enyme conversion, addition of cationic groups, and addition of hydroxyethyl groups. Modification by addition of hydroxyethyl groups produces materials called "gums" which are especially useful because they form aqueous solutions that do not "retrograde" or increase in viscosity with time. Examples include Ethylex Gums 2015, 2025, 2035, 2040, 2065, 2075, and 3030, available from A. E. Staley Manufacturing Company, Decatur, Ill.; Penford Gums 200, 220, 230, 240, 250, 260, 270, 280, 290, 300, 330, 360, and 380 available from Penford Products Company, Cedar Rapids, Iowa; and Clineos 702, 706, 712, 713, 714, 716, and 718 available from Archer Daniels Midland Company, Decatur, Ill.

Suitable proteins include casein which is isolated and used without significant modification, and soy proteins usually modified by controlled alkaline hydrolysis and other methods. Commercially available caseins include JO-3, JS-81, and HC-200 Brands from National Caseim of New Jersey, Riverton, N.J. Commercially available modified soy proteins include Arpros 1100, 2100, 2200, and 3100, available from Archer Daniels Midland Company, Decatur, Ill.; and Procotes 180, 183, 184A, 200, 240, 300, 400, 2500, 4200, and 5000, available from Protein Technologies, St. Louis, Mo.

Synthetic polymers which can be crosslinked and insolubilized by the methods of this invention include those with reactive functional groups described above. The most important of these are polyvinyl alcohols, of which Elvanols 90–50 and 71–30, from Dupont, Wilmington, Del.; Airvols 125, 165, 103, 305, 107, 321, 325, 350, 425, 502, 203, 205, 523, and 540 from Air Products, Allentown Pa.; and Unisizes HA-26 and HA-70, also from Air Products; are examples. Other synthetic polymers such as vinyl acetate latexes, acrylic latexes, and styrene-butadiene latexes are used extensively as pigment binders in paper coatings, but do not require insolubilizing additives. They are often used in combination with the reactive polymers described above.

The insolubilizers are typically added to the paper coatings at levels based on a weight ratio to the binding agent. For starch and modified starch binders, the insolubilizing agents can be added at levels from about 1 part to about 10 parts per 100 parts by weight of dry starch. These levels based on the weight of the binders are also appropriate for proteins and modified proteins and also for synthetic polymers such as polyvinyl alcohol.

The paper coatings may also contain other commonly added adjuvants such as lubricants, biocides, dyes, and pigments.

This invention also encompasses a method whereby a paper coating composition is applied to a paper product, and the pigment binder or paper surface coating composition is insolubilized in the curing thereof with polymers or other compounds which contain a plurality of carboxylic acid anhydride moieties on each molecular entity. The method includes the steps of:

1. Providing a paper coating composition that contains a binder or surface coating agent which contains functional groups which react with carboxylic acid anhydrides;

2. Adding to the paper coating composition an insolubilizing agent for the pigment binder or surface coating agent which is a carboxylic acid anhydride which contains a plurality of anhydride moieties on each molecular entity;

3. Applying the paper coating composition to a paper product; and

4. Curing the paper coating by allowing the carboxylic acid anhydride moieties to react with the active hydrogen atoms on the paper coating binder or surface coating agent.

Other than the requirement for the inclusion of a pigment binder or surface coating agent which will react with the carboxylic acid anhydride moieties of the insolubilizer, the composition of the coating is not critical. Paper coatings are usually aqueous dispersions which may contain pigments, dispersing agents, lubricants, biocides, and other common adjuvants in addition to one or more binder materials described above. Surface coatings are usually aqueous mixtures of modified starches and/or synthetic polymers, and may contain low levels of pigments and other common adjuvants. The pH is not critical, but is preferably greater than about 7.

The insolubilizig agents can be added to and dispersed into the coating compositions as small particle powders, but are preferably added as solvent solutions. The solvent solutions can be added directly to the coatings if adequately vigorous mixing is used to disperse the solutions into very small droplets in the coating. Alternatively the solvent solutions can be added to water with high shear mixing and this dispersion can be added to the paper coating. After the solvent solution of polymer is added to water either in the coating composition or in an intermediate dispersion, the compositions should be applied to the paper product and cured as quickly as practical to prevent the hydrolysis of the anhydride moieties before the curing step. The coating operation preferably takes place within 8 hours of the addition of the insolubilizer, and more preferably within 1 hour.

The manner by which the coating composition is applied to the paper product is not critical, and can be done by any of the methods common in the industry.

Curing is accomplished by reaction of the insolubilizing agent with the pigment binder or surface coating agent. This is facilitated by the removal of the water and solvent from the coating, by methods common in the industry, any of which may be suitable. The exact conditions are not critical. Heat accelerates the reaction and is preferably used. In practice, a typical cure involves drying the coated paper for about 1–3 seconds with an air stream at about 150 to 300° C., with the cure occurring for the most part in the paper roll, facilitated by the residual heat from the drying operation.

The following examples further illustrate the invention. As used herein all parts or percentages are parts or percentages by weight unless otherwise indicated.

EXAMPLE 1

Paper coatings were prepared as follows:

A starch solution was prepared by dispersing 22.5 parts of starch gum (Ethylex 2025) in 77.5 parts of cold water, heating the mixture at 95° C. for 30 minutes, and cooling to about 60° C. A clay dispersion was prepared by adding 53.6 parts of kaolin (KCS SC, from ECC International, Atlanta, Ga.) to 46.4 parts of water containing 0.1 parts of clay dispersant (Alcosperse 1567 from Alco Chemical, Chattanooga Tenn.). 27.6 parts of the starch solution was mixed with 72.4 parts of the clay dispersion, producing a mixture containing 38.8% kaolin, 0.08% dispersant, and 6.2% starch. The pH was adjusted to 8–9 with a few drops of concentrated ammonia and the insolubilizing reagent was added. The coating was mixed for 15–20 seconds with a high shear mixer, and immediately applied to 20#bond paper with a #5 coating rod (RD Specialties, Inc.).

The coated paper was air dried at 25° C. and 50% RH for at least 24 hours, then cured by placing in an oven at 100° C. for the specified time (10 or 30 minutes). The wet rub resistance of the cured coatings was tested by the following procedure:

A 2.5 cm square sample of the coated paper was placed in the bottom of a 50 ml beaker and a Teflon coated magnetic stiring bar with a round smooth surface (1"×⅜", 6.4 g) was placed on the paper sample. 25 ml of tap water at ambient temperature was added to the beaker, and allowed to stand for 1 minute. The swing bar was then rotated on the submerged paper at about 200–300 rpm for 2 minutes. Stirring was stopped, and the water in the beaker was immediately poured from the paper sample and diluted to 50 ml with tap water. To quantify the amount of coating removed, the % transmittance of light at 430 nm was measured in a 1 cm cell with a Spectronic 20 spectrophotometer. Higher transmittance values indicate less coating removed and therefore better insolubilization of the binder.

The following insolubilizing agent compositions were prepared and added to the paper coating at the levels of active material, based on the weight of starch, shown in Table 1:

A. A low molecular weight 1:1 styrene-maleic anhydride copolymer (SMA 1000A) screened to prepare a fraction that was −140 mesh.

B. SMA was dissolved at 40% by wt. in diethylene glycol dimethyl ether.

C. Benzophenone tetracarboxylic acid dianhydride was dissolved at 10% by weight in N-methyl pyrrolidinone.

The results shown in Table 1 were obtained.

TABLE 1

| Insolubilizing agent | % on wt. of starch | Cure time, min. | % Transmittance at 430 nm |
| --- | --- | --- | --- |
| Example 1A | 2 | 30 | 68 |
| Example 1A | 4 | 10 | 67 |
| Example 1A | 4 | 30 | 85 |
| Example 1B | 2 | 30 | 78 |
| Example 1B | 4 | 30 | 80 |
| Example 1C | 4 | 30 | 57 |
| None |   | 30 | 50 |

EXAMPLE 2

A paper surface coating composition was prepared as follows: A starch solution was prepared by dispersing 15 parts of starch gum (Ethylex 2025) in 85 part of cold water, heating the mixture at 95° C. for 30 minutes, and cooling to below 60° C. 50 parts of starch solution were mixed with 39.3 parts of water and the insolubilizing agent, added in the form described below, was dispersed into the mixture. 10.7 parts of a 76% calcium carbonate slurry (Hydrocarb 90 for Omya, Proctor, Vt.) was added. The final formulation was 7.5% active starch and 7.5% active calcium carbonate with the insolubilizing agents added at the levels indicated in Table 2. The following insolubilizing agents were tested:

A. Low molecular weight methylvinylether-maleic anhydride copolymer (Gantrez AN-119), prepared as a 10% dispersion in water by adding the powder to water with high shear mixing.

B. SMA 1000A, prepared as a 10% dispersion in water by adding the powder to water with high shear mixing.

C. (Comparative) The composition of Example 2B was heated for sufficient time to hydrolyze the anhydride groups.

D. Isobutylene-maleic anhydride copolymer, molecular weight approximately 5000–8000 (Isobam 600) prepared as a 10% dispersion in water by adding the powder to water with high shear mixing.

E. (Comparative) The composition of Example 2D was heated for sufficient time to hydrolyze the anhydride groups.

F. Butadiene-maleic anhydride copolymer, supplied as a 25% solution in acetone (Maldene 285).

G. Ethylene-maleic anhydride copolymer (EMA from Zeeland) prepared as a 10% dispersion in water by adding the powder to water with high shear mixing.

H. Hexene-maleic anhydride copolymer (PA-6 from Gulf Chemical) prepared as a 25% solution in acetone, and the acetone solution dispersed in water with high shear mixing.

I. (Comparative) A 50% active urea formaldehyde resin (CECA 4169B, CECA, Paris, France).

The paper surface coating compositions were applied, and the tests were conducted as described in Example 1. The results are shown in Table 2.

TABLE 2

| Insolubilizing agent | % on wt. of starch | Cure time, min. | % Transmittance at 430 nm |
|---|---|---|---|
| Example 2A | 4 | 20 | 70 |
| Example 2B | 4 | 20 | 78 |
| Example 2C (comparative) | 4 | 20 | 69 |
| Example 2D | 4 | 20 | 83 |
| Example 2E (comparative) | 4 | 20 | 68 |
| Example 2F | 4 | 20 | 76 |
| Example 2G | 4 | 20 | 56 |
| Example 2H | 4 | 20 | 67 |
| Example 2I (comparative) | 4 | 20 | 74 |
| None | | 20 | 51 |

EXAMPLE 3

An insolubilizing agent was prepared as follows: 33 parts of SMA 1000A was dispersed into 67 parts of hexyl acetate, and dissolved at 70° C. with stirring. (Lots of SMA 1000A varied and it was sometimes necessary to add small amounts of cyclohexanone to effect solution). The appropriate amounts of this solution to produce the levels shown in Table 3 were dispersed with high shear mixing into the surface coating composition described in Example 2. The resulting coating compositions were applied and tested by the method of Example 1 and the results of the tests are shown in Table 3.

TABLE 3

| % on wt. of starch | Cure time, min. | % Transmittance at 430 nm |
|---|---|---|
| none | 20 | 60 |
| 2.0 | 20 | 63 |
| 3.00 | 20 | 71 |
| 3.33 | 20 | 76 |
| 4.37 | 20 | 79 |

EXAMPLE 4

The surface coating composition of Example 2 was prepared. Insolubilizing agents were prepared as follows:

A. 43 g of SMA 1000A was dissolved in 57 g of a 75:25 wt:wt mixture of Exxate 700 and cyclohexanone.

B. 10 g of EMA was dissolved in 90 g of acetone.

C. (comparative) CECA 4169B

The insolubilizing agents were added to the paper coating composition with high shear, in the amounts shown in Table 4. The coating compositions were applied as described in Example 1. The wet rub resistance was determined using an Adams Wet Rub Tester (Montague Machines, Tuners Falls, Md.) according to the method supplied with the tester. The duration of the rub was 20 seconds. The tests were evaluated by determining the transmittance of the water used in the test. The results are shown in Table 4.

TABLE 4

| Insolubilizing agent | % added on wt. of starch | Transrnittance at 430 nm |
|---|---|---|
| Example 4A | 4 | 36 |
| Example 4A | 6 | 45 |
| Example 4B | 4 | 49 |
| Example 4B | 6 | 51 |
| Example 4C (comparative) | 4 | 39 |
| Example 4C (comparative) | 6 | 43 |
| None | | 33 |

EXAMPLE 5

The composition of Example 4A was added at 6% on the weight of starch to portions of the paper coating composition of Example 2. The portions had been adjusted with aqueous ammonia to the pH values shown in Table 5. The coating compositions were applied as described in Example 1. The wet rub resistance was determined using an Adams Wet Rub Tester. The duration of the rub was 20 seconds. The tests were evaluated by determining the transmittance of the water used in the test. The results are shown in Table 5.

TABLE 5

| Insolubilizing agent | pH of coating composition | % Transmittance at 430 nm |
|---|---|---|
| Example 4A | 8.05 | 41 |
| Example 4A | 9.15 | 46 |
| Example 4A | 9.50 | 53 |
| None | 7.50 | 33 |
| None | 10.00 | 40 |

EXAMPLE 6

Paper coatings with the compositions shown in Table 6 were prepared. The insolubilizing agents of Example 4A and Comparative Example 4C were added as indicated. The compositions were applied to paper as described in Example 1 and tested with the Adams Wet Rub Tester. The duration of the rub was 60 seconds. The composition of Example 4A effectively insolubilized the polyvinyl alcohol and the soy protein pigment binders and completely prevented removal of pigment in the test.

TABLE 6

| Binder | Pigment | Insolubilizing agent | % on wt. of binder | % T at 430 nm |
|---|---|---|---|---|
| 3% Polyvinyl alcohol | 15% CaCO₃ | Example 4A | 6 | 97 |
| 3% Polyvinyl alcohol | 15% CaCO₃ | Example 4C (comparative) | 6 | 95 |
| 3% Polyvinyl alcohol | 15% CaCO₃ | None | | 88 |
| 5% Soy protein | 35% Kaolin | Example 4A | 6 | 100 |
| 5% Soy protein | 35% Kaolin | None | | 95 |

The invention can be embodied in other forms without departing from the spirit or essential attributes thereof. Particularly it will be appreciated by those skilled in the art that alternative methods of addition to those disclosed could have utility in the invention. Reference should therefore be had to the following claims, rather than to the foregoing specification to determine the scope of the invention.

What is claimed is:

1. A paper coating composition comprising
   (a) at least one binder containing a plurality of functional groups capable of reacting with carboxylic acid anhydride moieties to form chemical bonds, and
   (b) at least one insolubilizing agent chosen from the group consisting of compounds containing a plurality of carboxylic acid anhydride moieties per molecular entity.
2. The composition of claim 1 wherein the said insolubilizing agent is provided as a solution in an aprotic solvent.
3. The composition of claim 1 wherein the said insolubilizing agent is provided as particles of less than about 100 microns in diameter.
4. The composition of claim 1 wherein the said insolubilizing agent comprises at least one copolymer of maleic anhydride.
5. The composition of claim 2 wherein the said insolubilizing agent comprises at least one copolymer of maleic anhydride.
6. The composition of claim 4 wherein the said insolubilizing agent comprises a copolymer of styrene and maleic anhydride.
7. The composition of claim 5 wherein the said insolubilizing agent comprises a copolymer of styrene and maleic anhydride.
8. The composition of claim 4 wherein the said insolubilizing agent comprises a copolymer of an aliphatic olefin and maleic anhydride.
9. The composition of claim 8 wherein the said insolubilizing agent comprises a copolymer of isobutylene and maleic anhydride.
10. The composition of claim 8 wherein the said insolubilizing agent comprises a copolymer of ethylene and maleic anhydride.
11. The composition of claim 1 wherein the reactive functional groups of the binder contain active hydrogen moieties.
12. A method of insolubilizing pigment binders and surface coating compositions comprising the steps of
    i. providing at least one paper coating composition which comprises a binder agent containing a plurality of functional groups capable of reacting with carboxylic acid anhydride moieties to form chemical bonds;
    ii. adding to the paper coating composition an insolubilizing agent which is a carboxylic acid anhydride which contains a plurality of anhydride moieties on each molecular entity;
    iii. applying the paper coating composition to a paper product; and
    iv. curing the paper coating by allowing the carboxylic acid anhydride moieties to react with the reactive functional groups on the paper coating binder.
13. Paper compositions which comprise paper bases coated with paper coating compositions comprising
    (a) at least one binder containing a plurality of functional groups capable of reacting with carboxylic acid anhydride moieties to form chemical bonds, and
    (b) at least one insolubilizing agent chosen from the group consisting of compounds containing a plurality of carboxylic acid anhydride moieties per molecular entity.
14. The composition of claim 13 wherein the said insolubilizing agent is provided as a solution in an aprotic solvent.
15. The composition of claim 13 wherein the said insolubilizing agent is provided as particles of less than about 100 microns in diameter.
16. The composition of claim 13 wherein the said insolubilizing agent comprises at least one copolymer of maleic anhydride.
17. The composition of claim 14 wherein the said insolubilizing agent comprises at least one copolymer of maleic anhydride.
18. The composition of claim 16 wherein the said insolubilizing agent comprises a copolymer of styrene and maleic anhydride.
19. The composition of claim 17 wherein the said insolubilizing agent comprises a copolymer of styrene and maleic anhydride.
20. The composition of claim 16 wherein the said insolubilizing agent comprises a copolymer of an aliphatic olefin and maleic anhydride.
21. The composition of claim 20 wherein the said insolubilizing agent comprises a copolymer of isobutylene and maleic anhydride.
22. The composition of claim 20 wherein the said insolubilizing agent comprises a copolymer of ethylene and maleic anhydride.
23. The composition of claim 13 wherein the reactive functional groups of the binder contain active hydrogen moieties.

* * * * *